(12) United States Patent
Maxwell

(10) Patent No.: US 10,136,590 B2
(45) Date of Patent: *Nov. 27, 2018

(54) TREE, STUMP AND POST PULLER

(71) Applicant: Christian Lane Maxwell, Oklahoma City, OK (US)

(72) Inventor: Christian Lane Maxwell, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,131

(22) Filed: Jul. 12, 2017

(65) Prior Publication Data

US 2018/0049378 A1  Feb. 22, 2018

Related U.S. Application Data

(63) Continuation-in-part of application No. 15/330,203, filed on Aug. 22, 2016.

(51) Int. Cl.
*A01G 23/06* (2006.01)

(52) U.S. Cl.
CPC .................. *A01G 23/065* (2013.01)

(58) Field of Classification Search
CPC ..... A01G 23/065; A01G 23/062; A01G 23/06
See application file for complete search history.

(56) References Cited

U.S. PATENT DOCUMENTS

| | | | | |
|---|---|---|---|---|
| 852,138 A * | 4/1907 | Reidel | ..................... | E21B 19/00 254/31 |
| 1,774,661 A * | 9/1930 | Otto | ......................... | B66C 1/64 254/132 |
| 2,535,099 A | 12/1950 | Slick | | |
| 3,059,905 A * | 10/1962 | Tompkins | ................. | E02D 9/02 254/132 |
| 3,307,643 A * | 3/1967 | Romolo | ............... | A01G 23/067 175/161 |
| 3,376,907 A * | 4/1968 | McNeal | ................. | A01G 23/06 144/2.1 |
| 3,647,185 A * | 3/1972 | Phibbs | ................. | A01G 23/065 254/30 |
| 3,707,895 A * | 1/1973 | McElderry | ........... | A01G 23/097 144/34.5 |
| 3,851,686 A * | 12/1974 | Hultdin | .................. | A01G 23/08 144/334 |
| 3,936,960 A * | 2/1976 | Clegg | .................. | A01G 23/046 111/101 |
| 3,958,613 A * | 5/1976 | Herz | .................... | A01G 23/065 144/24.12 |

(Continued)

*Primary Examiner* — Michael E Gallion
(74) *Attorney, Agent, or Firm* — Phillips Murrah PC; Martin G. Ozinga

(57) ABSTRACT

An apparatus for extracting trees, stumps, posts and similar structures from the ground is attached to a 3-point hitch tractor accessory. The apparatus comprises a base frame and a lifting frame. The base frame includes a pair of vertical guides for confining a corresponding pair of vertical rails on the lift frame. A piston/cylinder type of linear motor is connected between the base frame and lifting frame to translate the lifting frame relative to the base frame. A pair of independently controlled gripping cylinders that are connected to respective gripping cams are mounted on the lifting frame. A tree is extracted by engaging the gripping cams against the tree and translating the lifting frame.

3 Claims, 9 Drawing Sheets

(56) References Cited

U.S. PATENT DOCUMENTS

| | | | | |
|---|---|---|---|---|
| 4,067,369 A * | 1/1978 | Harmon | A01G 23/065 144/24.12 |
| 4,219,059 A * | 8/1980 | Albright | A01G 23/091 144/34.1 |
| 4,244,560 A * | 1/1981 | Hawkins | A01G 23/065 254/132 |
| 4,256,286 A * | 3/1981 | Hudgins | E04H 17/265 254/30 |
| 4,258,905 A * | 3/1981 | Brabander | E04H 17/263 254/29 R |
| 4,481,989 A * | 11/1984 | Peters | A01G 23/065 144/24.12 |
| 5,110,090 A * | 5/1992 | McDuffie | B66F 3/36 254/124 |
| 5,671,788 A * | 9/1997 | Rewis | A01G 23/065 144/24.12 |
| 5,794,716 A * | 8/1998 | White | E02D 13/04 173/189 |
| 6,382,594 B1 * | 5/2002 | Ransom | E04H 17/265 254/30 |
| 6,641,347 B2 * | 11/2003 | Ewington | B66F 3/36 254/29 R |
| 6,976,670 B1 * | 12/2005 | Woolley | E04H 17/265 254/133 R |
| 7,059,587 B1 * | 6/2006 | Fimple | E04H 17/265 254/133 R |
| 7,137,616 B2 * | 11/2006 | Kysely | E04H 17/265 254/30 |
| 8,453,993 B2 * | 6/2013 | Davis | E04H 17/265 254/120 |
| 8,544,946 B2 * | 10/2013 | Holden | B66F 9/184 254/30 |
| 2007/0033839 A1 * | 2/2007 | Jarvinen | A01G 23/065 37/302 |
| 2009/0000698 A1 * | 1/2009 | Beresford | A01G 23/08 144/336 |
| 2016/0230414 A1 * | 8/2016 | Lawrence | E04H 17/265 |
| 2018/0049377 A1 * | 2/2018 | Maxwell | A01G 23/065 |
| 2018/0049378 A1 * | 2/2018 | Maxwell | A01G 23/065 |

* cited by examiner

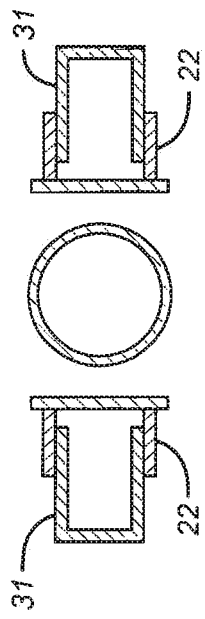
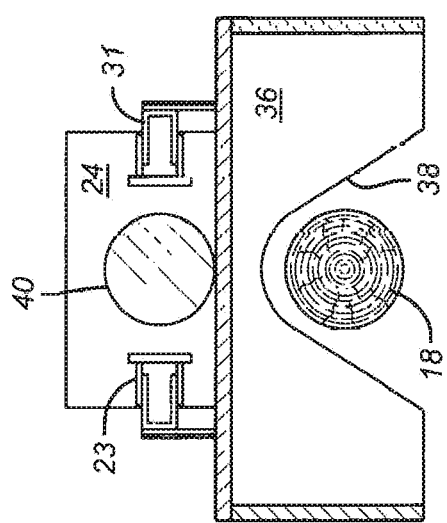
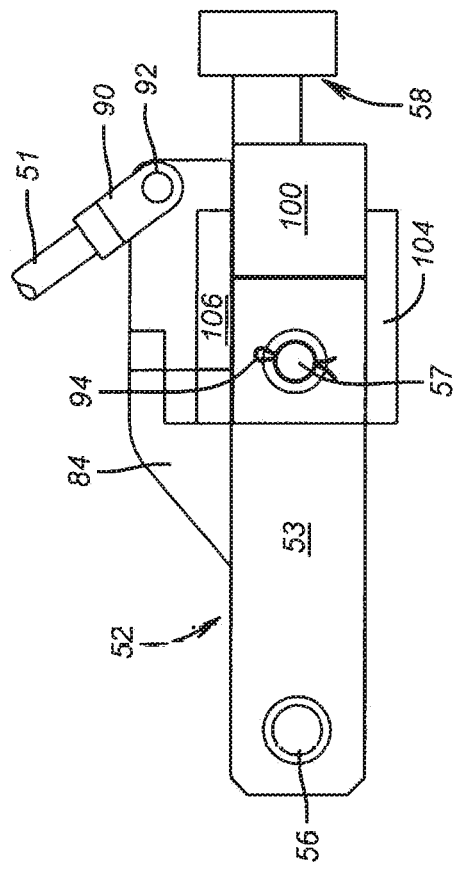

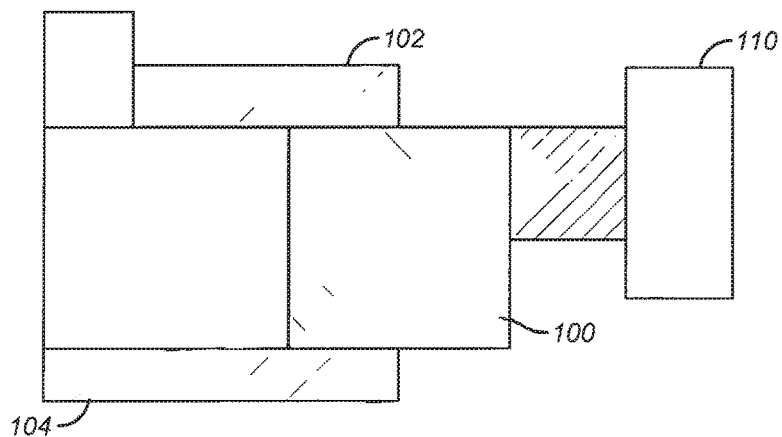
FIG. 12
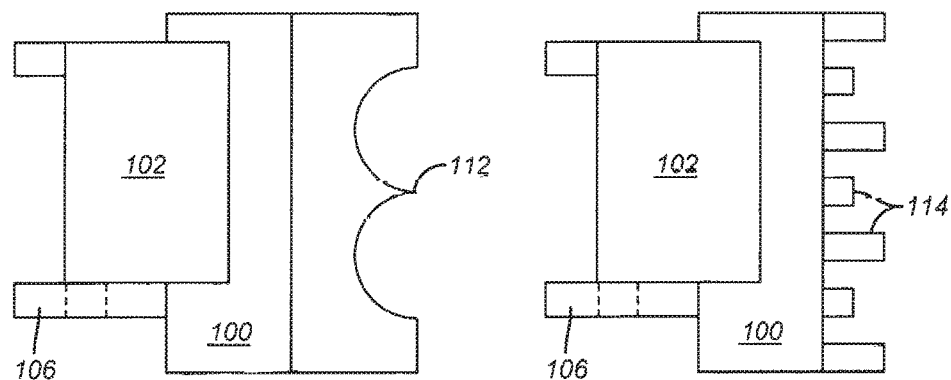
FIG. 13          FIG. 14

TREE, STUMP AND POST PULLER

CROSS-REFERENCE TO RELATED APPLICATION

This is a continuation-in-part that claims priority from patent application U.S. Ser. No. 15/330,203 filed on Aug. 22, 2016 and incorporated by reference herein.

BACKGROUND OF THE INVENTION

Field of the Invention

This invention generally relates to agriculture and landscaping. More specifically, the invention relates to mechanical removal of unwanted trees, tree stumps, brush, posts, from areas such as farms, pasture lands, woodlots, and landscape areas.

Description of Related Art

Mechanical tree removal methods presently available are by sawing, cutting, shearing, dozing, spading, digging or pulling. Removal of trees by uprooting eliminates stumps that can impede other operations (such as farming and vehicle traffic) and reduces the likelihood of re-sprouting and regrowth by removing the majority of the root system.

Sawing, cutting or shearing of trees leaves the stump and root system intact requiring spraying with poison to prevent regrowth. Moreover, the presence of stumps may be detrimental to agriculture operations or cause damage to tires or vehicles that travel in the area.

The cost of dozing can be expensive and may not be cost effective for selectively clearing a small area or removal of a small number of trees. Moreover, dozing may potentially incur additional project expenses for reseeding with desired vegetation, due to the large area that bulldozers leave bare.

Spading of larger trees requires specialized equipment and is common to the nursery or fruit and nut industry where transplanting the tree to a different location is also desired.

Digging by hand or mechanically is not an efficient manner of removal especially if a large quantity of trees are to be removed.

Pulling the entire tree or stump is currently done with jaws or some gripping device mounted on a mobile carrier. Most of such devices are limited to smaller trees, bushes or posts because the uprooting force is transferred to the frame and suspension of the mobile carrier such as a tractor or skid loader.

SUMMARY OF THE INVENTION

The present invention includes an independent frame assembly comprising a base frame and a lifting frame secured to a mobile carrier. The lifting frame is confined by guide rails to vertical translation relative to the base frame. A linear motor such as a double-acting main fluid cylinder connected between the base frame and lifting frame drives the vertical translation. A pair of independently controlled linear motors such as fluid cylinders mounted on the lifting frame drive gripper cams to grasp the tree or stump for extraction.

Preferably, the invention assembly is mounted on a powered lifting mechanism such as a 3-point hitch that is integrated with a general utility tractor, skidder, crawler, truck or other powered mobile carrier for operational placement against a tree or stump to be removed. It is also preferable for the mobile carrier to be equipped with an auxiliary power take-off drive or fluid power source such as a pump or compressor to drive the fluid cylinders.

The lifting frame also includes a pair of independently controlled and operated clamping cylinders. The independently controlled clamping cylinders are connected to respective gripper cams, which hold the tree or stump to the lifting frame during an extraction. The gripper cams comprise easily replaced claw units of various size and configuration having interlocking square teeth, for example, to accommodate the varying size of tree trunks that may be encountered. An independent clamping cylinder control feature of the invention may be desirable if several small diameter saplings are to be extracted from the earth as a gathered bundle. Similarly, a single, flexible sapling may be extracted by closing one gripper cam first against the sapling trunk and then another. The operational sequence makes a bend or slight bow in the small tree trunk allowing for a tighter grip with more contact area due to wedging action when the lifting cylinder is activated.

The design of the gripper is such that when the gripper cams are in a fully closed position they are never perpendicular to the tree trunk but have a slight upward angle to reduce the bending force on the interlocking teeth and direct more force into the pin/hinge of the pivoting gripper cam. Stop tabs welded to the lifting frame prevent the rotation of the gripper cams to a perpendicular engagement alignment with the tree trunk. When closed against a tree trunk and gripper cams are not "bottomed out" on the stop tabs, lifting force on the tree will increase gripper cam contact force against the tree by a wedging action and reduce the risk of slipping or stripping the bark. Notably, the gripper cam comprises a base frame and a detachable claw unit.

Operational procedure with the invention includes positioning the invention frame assembly with a carrier vehicle such as a tractor or other vehicle next to the tree with the gripper cams open. A base plate portion of the base frame is placed on the ground adjacent the tree or stump to be removed. The clamping cylinders are activated to engage the gripper cams with the tree. Application of fluid pressure to the lifting cylinder moves the lifting frame away from the base plate thereby exerting upward force on the tree trunk. The earth is used as the lifting force reaction point. Hence, no loads are placed on the tractor or vehicle wheels or suspension during the uprooting operation.

Fluid pressure may be supplied to the lifting cylinder and clamping cylinders by a fluid pump or compressor. In a preferred embodiment, a 2,500-psi hydraulic pump integral with the frame assembly may be driven by the mobile carrier PTO. When coupled with a 6" hydraulic main cylinder, over 70,000 lbs. of uprooting force may be generated.

If the tree is not uprooted by one full stroke of the main cylinder, hydraulic pressure on the clamping cylinders may be released and pressure applied to the opposite side of the double-acting lifting cylinder piston to stroke downward for engaging the gripper cams with a lower section of trunk and repeat the process.

Fluid pressure controls may be permanently mounted on the base frame for operation while standing beside it. Alternatively, the controls may be mounted on the mobile carrier adjacent the driver's seat thereby allowing the driver to operate both the carrier and the invention without leaving the driver's seat.

Fluid controls over the main lifting cylinder include a detent valve to stop either upward or downward movement of the lifting cylinder when it has reached full stroke of either extension or retraction.

A fluid flow control valve is used in the service lines that function the two clamping cylinders on the gripper cams. This allows a constant pressure maintenance on the clamping cylinders and tends to prevent a slight opening movement of the gripper cams during the uprooting process. Due to the slight compressibility of wood, the force exerted by the gripper cams can cause some deformation of the wood fibers. The constant clamping cylinder pressure allows for some additional closing movement of the grippers. The flow control valves allow for constant pressure or increasing pressure to be applied to the clamping cylinders during the uprooting process. When uprooting a tree, there are some movements and flexing of the unit due to flexibility of the trees and their center of gravity. A loss of gripping force at this time could result in the tree falling prematurely or slippage of the gripping force.

After the tree is uprooted, the mobile carrier lifting mechanism such as a three point tractor hitch or front end loader can slightly lift the removed tree for transport to a disposal site. The tree is then detached from the invention by opening the two clamping cylinders.

BRIEF DESCRIPTION OF THE DRAWINGS

The advantages and further features of the invention will be readily appreciated by those of ordinary skill in the art as the same becomes better understood by reference to the following detailed description when considered in conjunction with the accompanying drawings in which like reference characters designate like or similar elements throughout.

FIG. 6. Is the cross-section view VI-VI of FIG. 2.

FIG. 7. Is the cross-section view VII-VII of FIG. 2.

FIG. 8. Is an elevation view of a preferred gripper cam assembly.

FIG. 12 is a cross-section view of the FIG. 11 claw unit.

FIG. 13 is a plan view of an alternative claw unit.

FIG. 14 is a plan view of an alternative claw unit.

DESCRIPTION OF THE PREFERRED EMBODIMENTS

As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Figure 1:
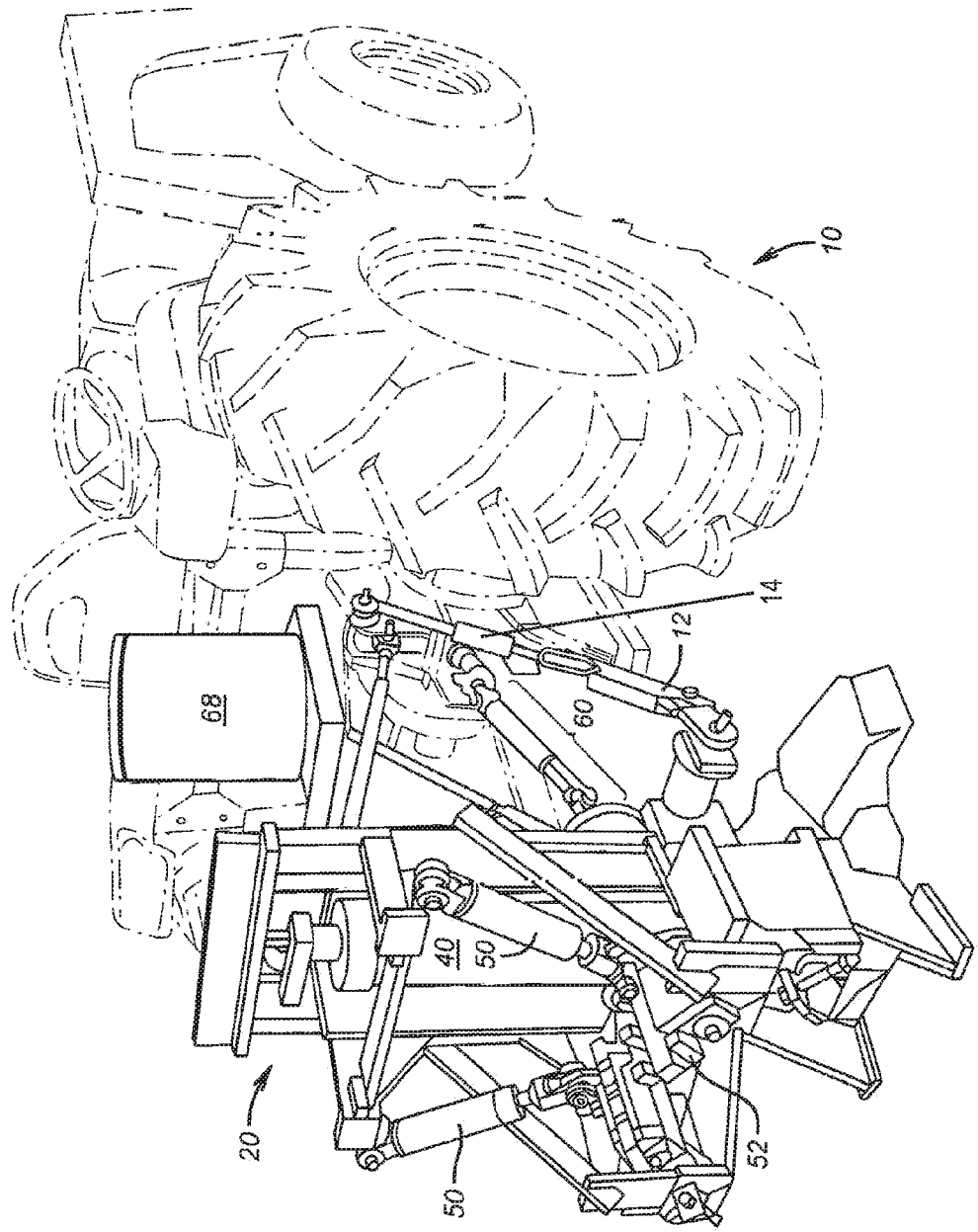
FIG. 1. Is a pictorial view of the present invention mounted on a general utility farm tractor.

For an overview of the invention and its operating environment, reference is given to FIG. 1 showing a standard utility tractor 10 having 3-point hitch and a rotary power take-off accessories. The hitch accessory normally includes three hitch bars 12 and lifting struts 14. The hitch bars 12 are attached to invention base frame 22 portion of frame assembly 20.

Those of skill in the art will understand that use of utility tractor 10 with a 3-point hitch and rotary power take off is merely representative of a suitable mobile carrier for the invention. Other suitable carriers may include skidders, crawlers and modified trucks equipped with an auxiliary power source such as a rotating power take-off or auxiliary fluid power in the form a hydraulic pump or air compressor.

Figure 2:
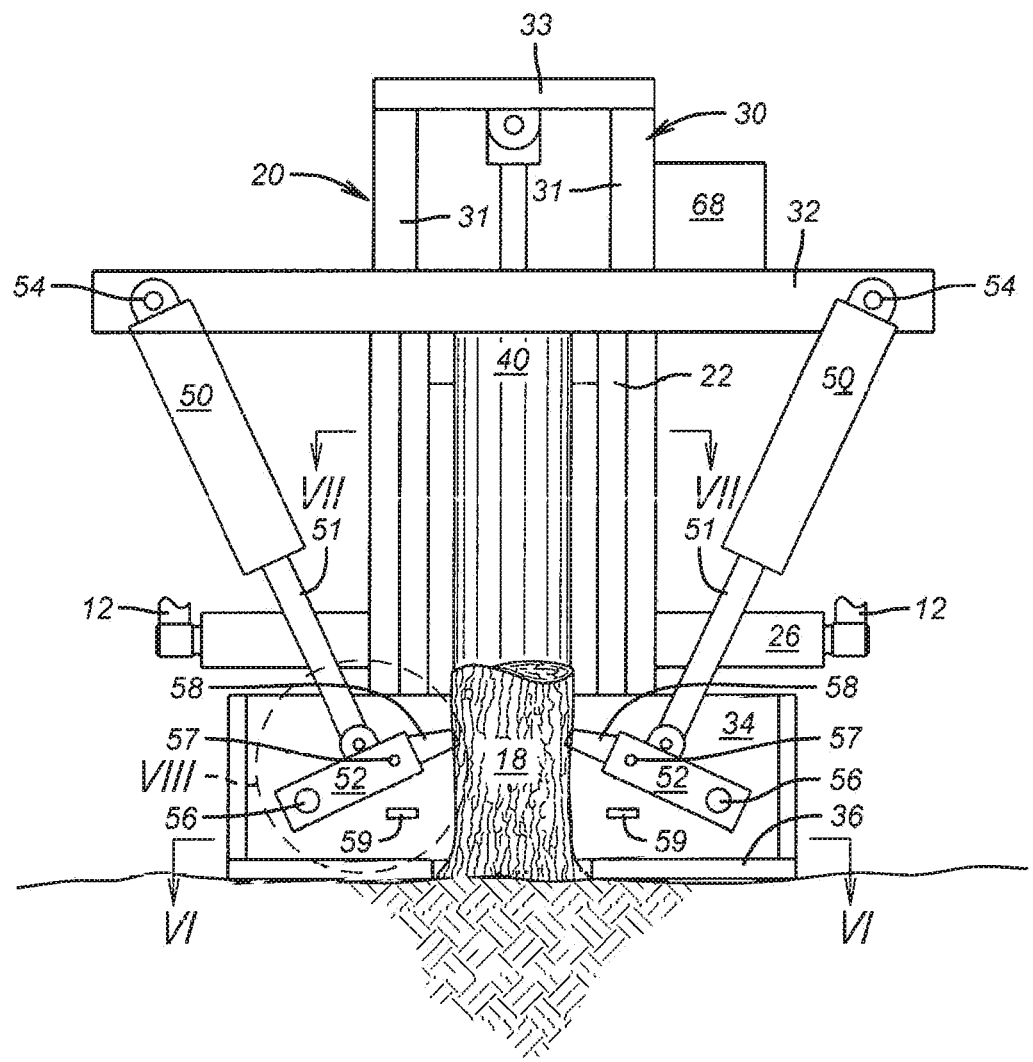
FIG. 2. Is a frontal view of the invention at an initial engagement position with a rooted tree base.
Figure 3:
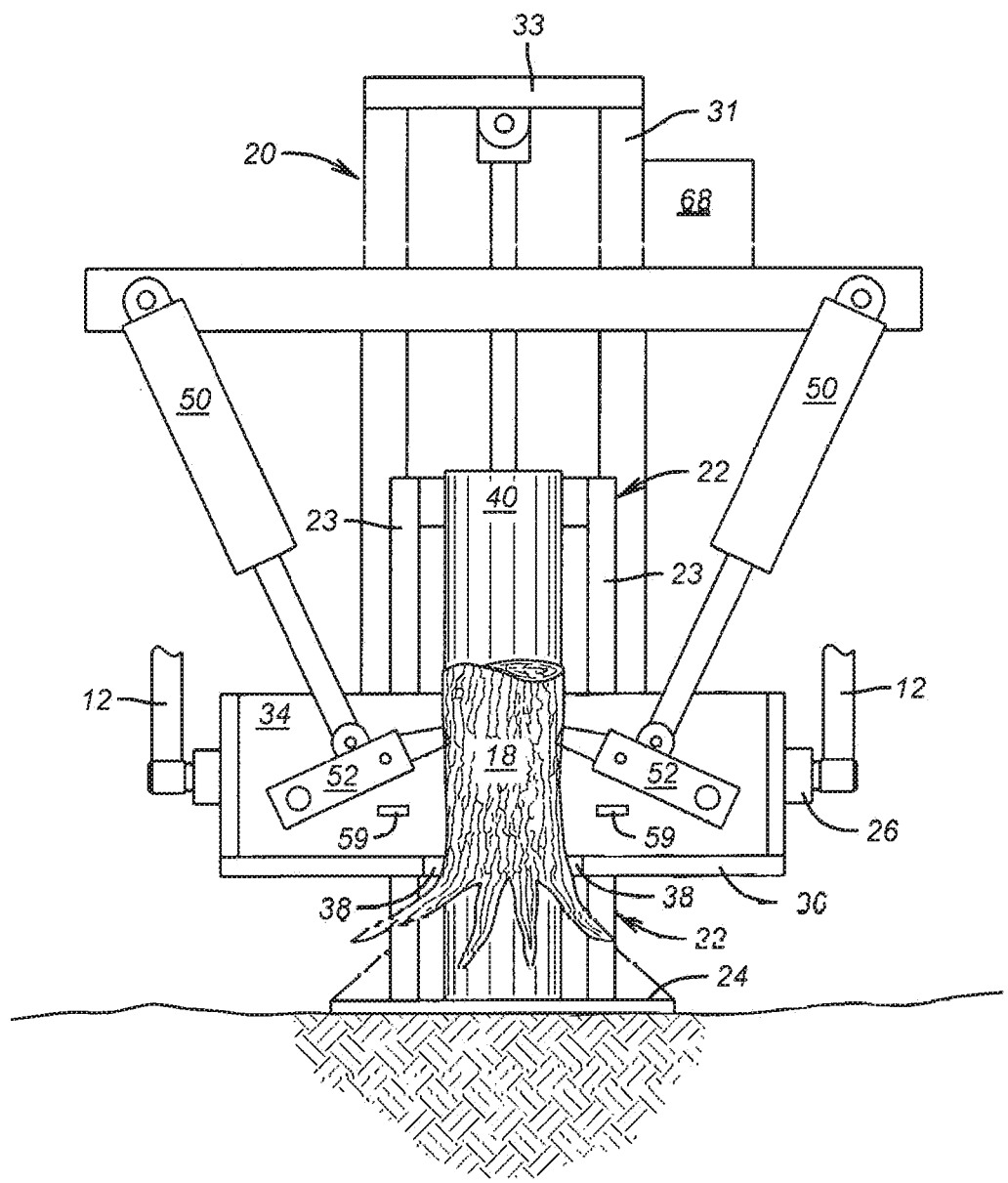
FIG. 3. Is a frontal view of the invention engaged with an up-rooted tree.
Figure 4:
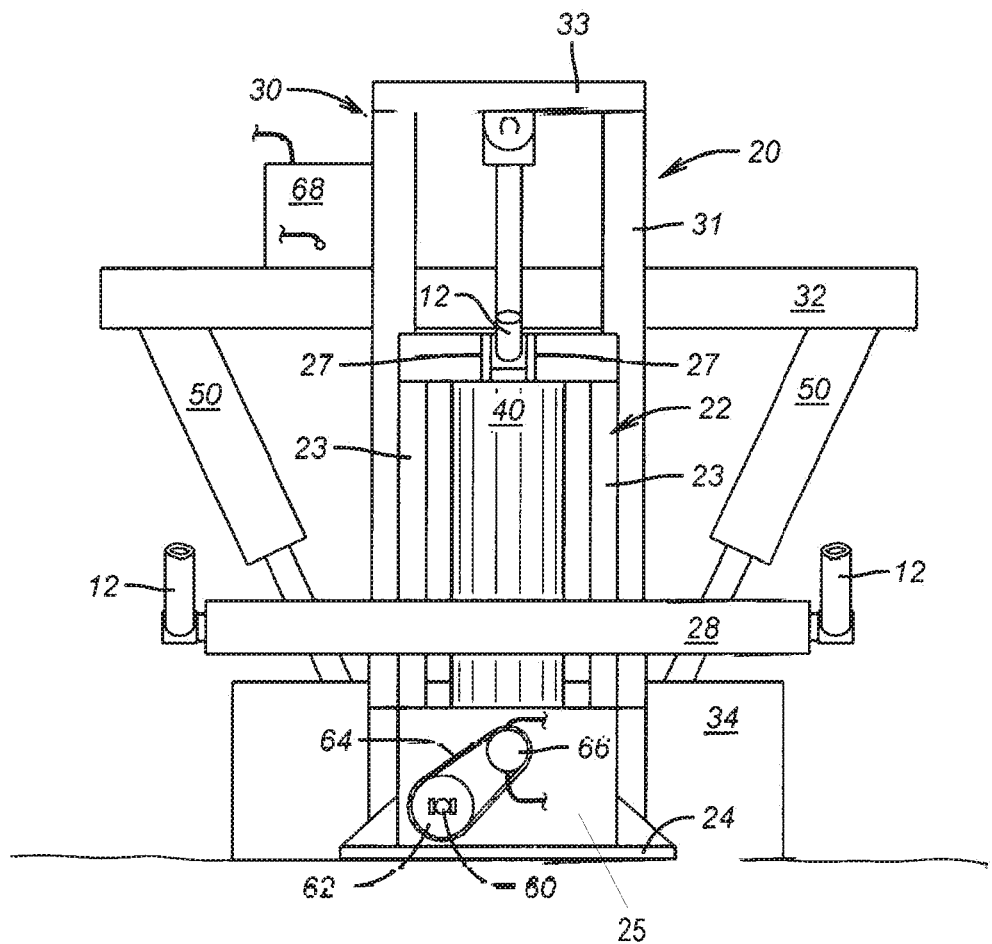
FIG. 4. Is a back-side view of the invention at an initial tree engagement position.

Referring to FIG. 2, the invention frame assembly 20 comprises base frame 22 and a lifting frame 30. With respect to FIGS. 2, 3 and 4, the base frame 22 comprises a pair of parallel guide channels 23 on opposite sides of a lifting cylinder 40 supported by a base plate 24 (FIG. 3). The parallel guide channels 23 extend normally from and perpendicular to the base plate 24. As shown by FIG. 4, a pump plate 25 bridges the lower ends of the two guide channels 23 and carries a rotary PTO outdrive joint 60. A chain or belt 64 drive sprocket 62 may be rotatively driven by the PTO outdrive joint 60. The chain or belt 64 drives a hydraulic pump 66, for example. Of course, a shaft and gear drive may also be used to transfer rotary power to the pump 66.

A hitch beam 28 is secured to the guide channels 23. Opposite ends of the hitch beam carry pivot pins for receiving; hitch bar 12 connector journals. It is important to note that substantially the entire weight of the frame assembly 20 is lifted by the hitch beam 28 via the tractor lift struts 14. The back-side view of FIG. 4 shows a pair of pin plates 27 secured to the base frame 22 for receiving the third hitch bar 12 of the 3-point hitch system.

The lifting frame 30 comprises a pair of parallel guide rails 31 that are respectively nested within the trough of the guide channels 23. The upper ends of the guide rails 31 (FIG. 2) are tied together by a crown beam 33. The lower ends of the guide rails 31 are secured to cam plate 34. A lifting plate 36, secured to the bottom edge of the cam plate 34, projects normally from the cam plate plane. Centrally of the lifting plate 36 outer edge is a notched opening 38 (FIG. 6). of sufficient width to receive the base diameter of largest tree 18 expected for removal.

Also secured to the guide rails 31 is a transverse crossbar 32 having pivot pin connections 54 at opposite ends to receive the cylinder end, for example, of each clamping cylinder 50. Rod end 51 of each clamping cylinder 50 is pivotally secured to respective gripper cams 52. A hydraulic fluid reservoir 68 may be suitably positioned on one side of the crossbar 32.

The gripper cams 52 are secured to the cam plate 34 for pivoting about respective spindles 56. The spindle 56 axes are aligned substantially normal to the translation plane that passes through both guide rails. Preferably, the spindles 56 are secured to the cam plate 34 on equally opposite sides of a plane that is centrally normal to said translation plane. Stop tabs 59 that are secured to the face of the cam plate 34 are positioned to prevent the gripper cams 52 from rotating to a substantially perpendicular alignment of a gripper claw unit 58 with the cam spindle 56 axis under the stress of extracting tree 18. Maintenance of an acute angle of gripper cam engagement increases gripping force against a tree 18 as it is lifted from the ground.

A more detailed explanation of a preferred embodiment of the gripper cam 52 construction and assembly is expansively illustrated by FIGS. 8-12. The gripper cam 52 assembly includes a base frame 53 shown in isolation by FIG. 9. The base frame 53 body may be a fabricated box having a pair of journal ears 80 for supporting a pair of axially aligned journal apertures 81. The apertures 81 receive the gripper cam spindles 56 for pivotal movement about the spindle axis. Near inside edge 82 of the base frame 53 is an operating arm 84, which is positioned above the upper plane of the base frame 53 for an advantageous location of pin aperture 86. Referring to FIG. 8, the rod end 51 of the clamping cylinders 50 carries a clevis 90 that is pivotally secured to the operating arm 84 by a pin 92 that penetrates the clevis 90 and the operating arm 84 aperture 86. A retainer pin 57, secured to the outside edge of the base frame 53, extends normally from the outside edge. Retainer pin aperture through the pin 57 receives a removable/replaceable shear pin element 94 such as a cotter pin or D-ring.

Figure 10:
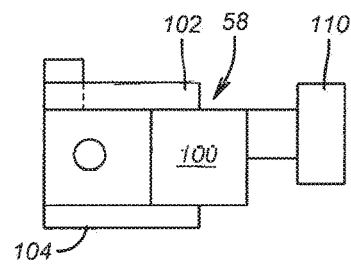
FIG. 10 is an elevation view of the gripper cam claw unit.
Figure 11:
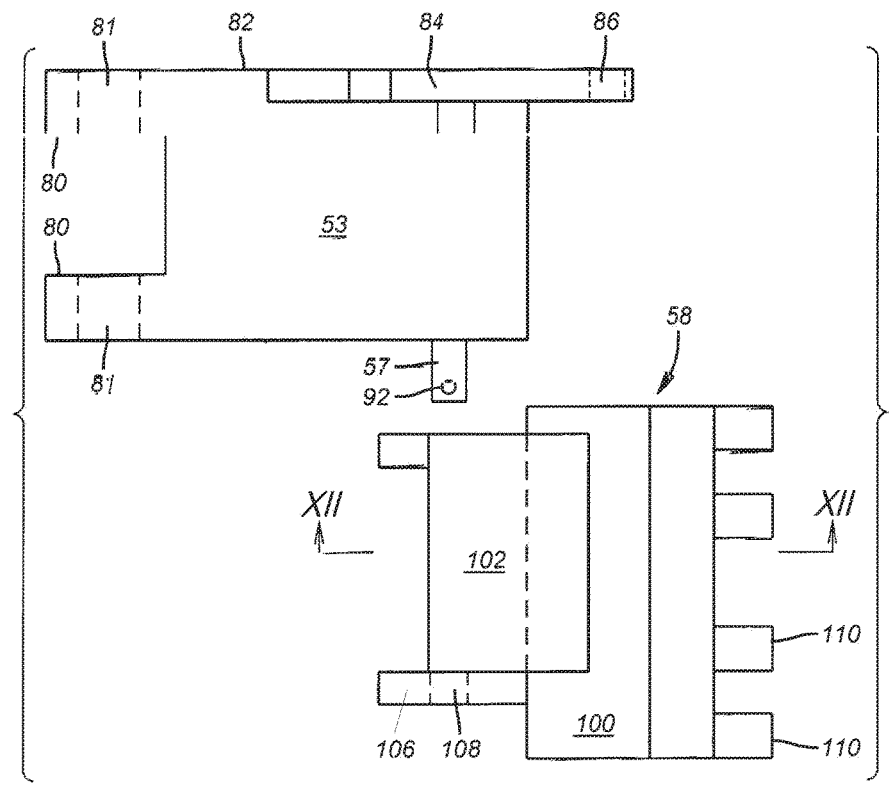
FIG. 11 is a dynamic plan view of the FIG. 8 of the gripper cam assembly procedure.

One embodiment of the gripper claw unit 58 is illustrated by FIGS. 10, 11 and 12. The length of a base bar 100 extends along the width of the unit 58 and supports upper cladding plate 102 and lower cladding plate 104. Attachment is most conveniently by welding but other procedures such as bolting or machining from solid stock are also suitable. A cheek piece 106 is secured to the outer end of the base bar 100, to the end of the upper cladding plate 102 and to the upper end face of the lower cladding plate 104. An aperture 108 in the cheek piece 106 is sized and positioned to receive the retainer pin 57. The dynamic plan view of FIG. 11 shows the claw unit 58 to be transposed upon the base frame 53 with the upper plate 102 and lower cladding plate 104, confining the base frame 53 body between them. Retainer pin 57 penetrates the cheek piece 106 aperture 108 and shear pin element 94 such as a cotter pin or D-ring through retainer pin 57 aperture prevents undesired displacement.

From the forward edge of the base bar 100 are numerous tree engaging elements such as square bars 110. Preferably, the bar elements 110 are positioned along the base bar 100 length in meshing opposition to those elements of the opposite side claw unit 58.

FIGS. 13 and 14 illustrate other tree or brush engaging elements such as the tree trunk penetrating point 112 of FIG. 13 and staggered depth bars 114 of FIG. 14.

Figure 5:
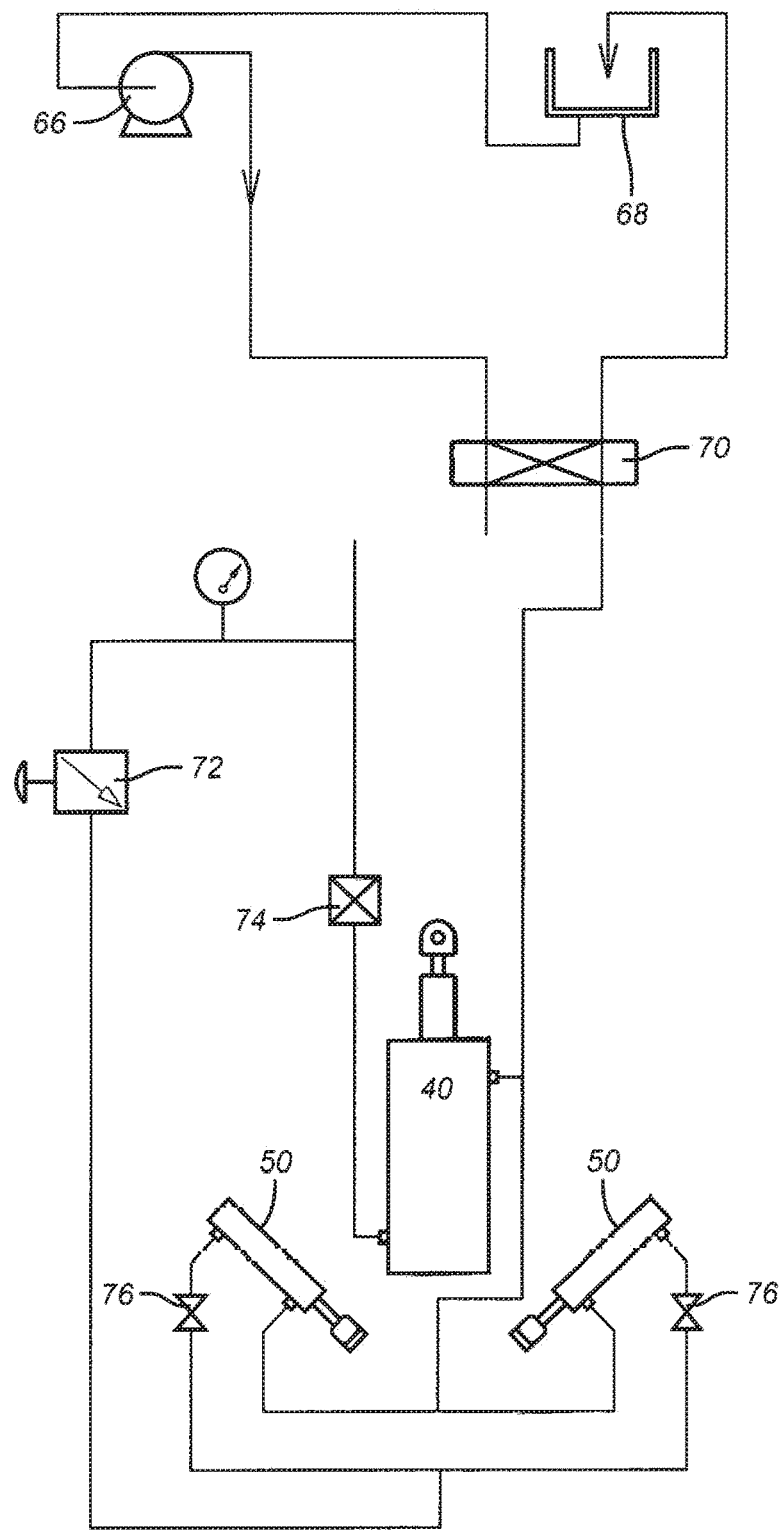
FIG. 5. Is a representative hydraulic flow control schematic for the invention.
Figure 9:
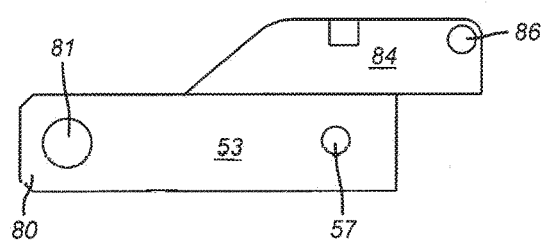
FIG. 9 is an elevation view of the FIG. 8 gripper cam base frame.

FIG. 5 illustrates a representative piping schematic for a hydraulic fluid pressure system. Notwithstanding a preference for hydraulic fluid controls, it will be understood that a pneumatic fluid medium may be preferable in some circumstances. Hence, pneumatic analogs may be substituted for the hydraulic devices described herein.

With respect to the hydraulic schematic of FIG. 5, pump 66, driven by the tractor rotary PTO, draws fluid from the reservoir 68. All flow from the pump 66 is initially directed through lift valve 70. From the lift valve 70, fluid flow is divided between the lifting cylinder 40 and the clamping cylinders 50. Distinctively, hydraulic fluid flow to clamping cylinders 50 is regulated through a flow controller 72. Downstream of the flow controller 72, the flow stream is divided between the respective clamping cylinders 50. However, either flow stream may be independently closed by shut-off valves 76. Similarly, fluid supply to the lifting cylinder 40 may be interrupted by shut-off valve 74.

Suitable positions, albeit not exclusive, for the pump 66 and reservoir 68 are described above. Fluid control elements such as the lift valve 70, flow controller 72 and the shut-off valves 74 and 76 may be positioned for convenience. If a 2-man operation is preferred, the control elements may be mounted on the base frame for convenient operation standing alongside of the apparatus. The same elements may be mounted on the mobile carrier for operation by the carrier driver.

Figure 15:
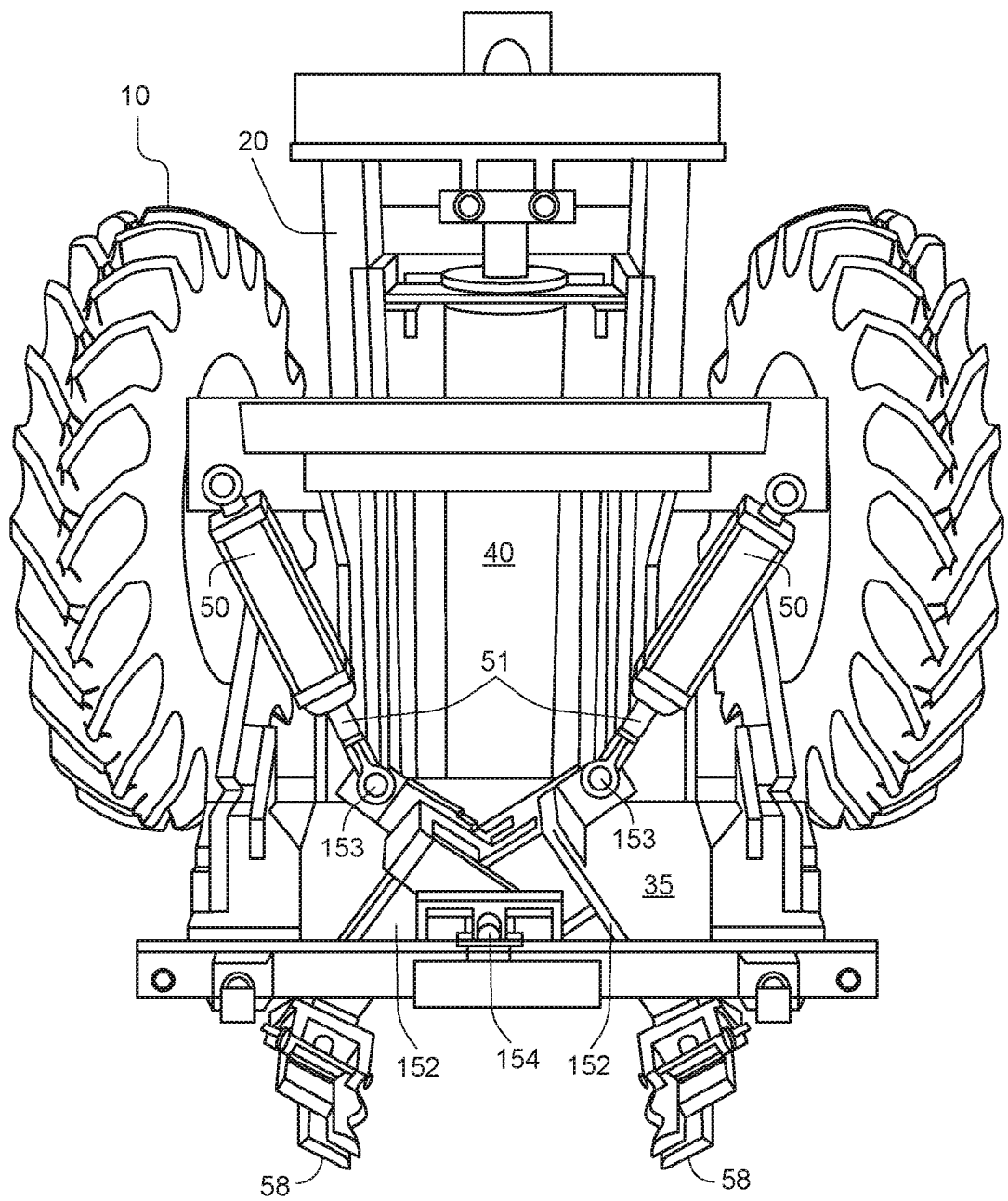
FIG. 15 is a frontal view of another preferred embodiment of the invention.

FIG. 15 generally depicts another preferred embodiment of the invention that may be utilized to selectively attach to a tree for removal below the ground surface as well as above. This may be utilized with trees, shrubs, bushes, and so forth. It is also contemplated this embodiment may come as a part, separately, and or as a conversion of the above discussed embodiments as well as generally utilize the same framework.

It is therefore contemplated that clamping cylinder(s) 50, rod end(s) 51 of each may be pivotally secured to respective arms 152 with respective pivots 153. Arm(s) 152 are pivotally positioned on cross beam 35 via pivot 154. It is understood that clamping cylinder(s) 50 generally bring gripper claw(s) 58 rotationally together to attach to the item to be removed when cylinder(s) 50 are selectively expanded thereby rotating arm(s) 152 around pivot 154. Reverse of same moves gripper claw(s) 58 away from each other for release of the item.

The invention may also be utilized as a wood splitter. It is contemplated that a wedge known in the art may be positioned at the bottom and or otherwise attached. It is still further contemplated that the invention may be utilized as a post driver as well as other contemplated utilities and numerous implementations.

It is therefore contemplated that the current invention may be an apparatus for pulling trees or stumps from the ground comprising: a frame assembly having a base frame and a lifting frame, said base frame having a substantially parallel pair of guide channels, said lifting frame having a substantially parallel pair of guide rails confined to translation along said guide channels; a mobile carrier for supporting and positioning said frame assembly adjacent to a tree or stump; a first linear motor secured to said base frame and to said lifting frame for translating said guide rails along said guide channels, said first linear motor being powered by a fluid pressure system; second and third linear fluid motors secured to said lifting frame and to respective gripping cams, said second and third linear motors being powered by said fluid pressure system; respective pivot spindles secured to said lifting frame, respective axes of said axles aligned substantially normal to a translation plane of said guide rails; said gripping cams secured to said spindles for pivotal movement thereabout to be driven in respectively opposite pivotal directions by said second and third linear motors; first fluid controls for selecting a translation direction of said first fluid motor; and, second fluid controls to apply continuous fluid pressure to one or both of said first and second fluid motors for independently pivoting one or both of said gripping cams against a tree or stump for extraction from the ground by translation of said first fluid motor.

It may also be an apparatus for pulling trees or stumps described wherein said mobile carrier includes an auxiliary power source for driving a hydraulic pump; wherein said auxiliary power source is a rotary power take-off; wherein said hydraulic pump is secured to said base frame; and wherein said second fluid controls comprise valves respective to each of said second and third fluid motors to block fluid pressure to a respective second or third motor.

Still further, it may be an apparatus for pulling trees or stumps from the ground comprising: a frame assembly having a base frame and a lifting frame, said base frame having a substantially parallel pair of guide channels, said lifting frame having a substantially parallel pair of guide rails confined to translation along said guide channels; a mobile carrier for supporting and positioning said frame assembly adjacent to a tree or stump; a first linear motor secured to said base frame and to said lifting frame for translating said guide rails along said guide channels, said first linear motor being powered by a fluid pressure system; second and third linear fluid motors secured to said lifting frame and to respective gripping cams, said second and third linear motors being powered by said fluid pressure system; respective pivot spindles secured to said lifting frame, respective axes of said spindles aligned substantially normal to a translation plane of said guide rails; said gripping cams secured to said spindles for pivotal movement thereabout to be driven in respectively opposite pivotal directions by said second and third linear motors; and claw units detachably positioned on said gripping cams for engaging a tree of stump, a position of said claw units on said gripping cams being secured by a single shear pin device.

It may also be an apparatus wherein said gripping cams each comprise a body having upper and lower surfaces, a width of said surfaces corresponding to a length of said spindles; wherein said claw units comprise upper and lower cladding plates spaced to adjacently overlap said upper and lower gripping cam body surfaces; wherein a retainer pin from an outer edge of said gripper cam body substantially parallel with said spindle axis; and wherein said retainer pin comprises a transverse aperture to receive said shear pin device.

Although the invention disclosed herein has been described in terms of specified and presently preferred embodiments, which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. An apparatus for pulling trees or stumps from the ground comprising:
   a frame assembly having a base frame and a lifting frame, said base frame having a substantially parallel pair of guide channels, said lifting frame having a transverse crossbar, a cross beam, and a substantially parallel pair of guide rails confined to translation along said guide channels;
   a mobile carrier for supporting and positioning said frame assembly adjacent to a tree or stump;
   a first lifting cylinder secured to said base frame and to said lifting frame for translating said guide rails along said guide channels, said first cylinder being powered by a fluid pressure system and adapted to lift said trees or stumps from said ground;
   second and third cylinder having respective top ends pivotally secured to said transverse crossbar of said lifting frame and having respective bottom ends pivotally attached to respective gripping claws, said second and third cylinder being powered by said fluid pressure system and adapted to provide an upward angle force for gripping said tree or stump by;
   said respective gripping claws pivotally secured to said cross beam of said lifting frame, respective axes of said gripping claws aligned substantially normal to a translation plane of said guide rails; said gripping claws secured to said cross beam for pivotal movement thereabout to be driven in respectively opposite pivotal directions by said second and third cylinder; and
   wherein said fluid pressure system includes fluid pressure controls for selecting a translation direction of said first cylinder and adapted to independently, apply continuous fluid pressure to one or both of said second and third cylinder for independently pivoting one or both of said gripping claws at an upward angle against and penetrating a tree or stump for extraction from the ground by translation of said first cylinder.

2. The apparatus for pulling trees or stumps described by claim 1 wherein said mobile carrier includes an auxiliary power source for said fluid pressure system.

3. The apparatus for pulling trees or stumps described by claim 2 wherein said auxiliary power source is a rotary power take-off.

* * * * *